(12) United States Patent
Caradec (10) Patent No.: US 7,885,223 B2
(45) Date of Patent: Feb. 8, 2011

(54) COMMUNICATIONS INFRASTRUCTURE FOR CONTENT DELIVERY USING EDGE SERVERS

(75) Inventor: Jean-Philippe Caradec, Meylan (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 818 days.

(21) Appl. No.: 11/660,947

(22) PCT Filed: Aug. 31, 2005

(86) PCT No.: PCT/EP2005/054290

§ 371 (c)(1),
(2), (4) Date: Sep. 12, 2007

(87) PCT Pub. No.: WO2006/024649

PCT Pub. Date: Mar. 9, 2006

(65) Prior Publication Data

US 2008/0205326 A1 Aug. 28, 2008

(30) Foreign Application Priority Data

Sep. 3, 2004 (EP) .................................. 04300575

(51) Int. Cl.
*H04Q 7/00* (2006.01)
*H04L 12/28* (2006.01)

(52) U.S. Cl. ........................................ 370/328; 370/401
(58) Field of Classification Search ................. 370/328, 370/400, 401; 709/203, 217–219
See application file for complete search history.

(56) References Cited

U.S. PATENT DOCUMENTS 6,981,029 B1 * 12/2005 Menditto et al. ............ 709/217

(Continued)

FOREIGN PATENT DOCUMENTS

WO 03/017703 2/2003

OTHER PUBLICATIONS

Roy et al., "Architecture of a Modular Streaming Media Server for Content Delivery Networks," Proceedings 2003 International Conference on Multimedia and Expo. IEEE, vol. 3, Jul. 9, 2003, pp. 1-4.

(Continued)

*Primary Examiner*—Hong Cho (57) ABSTRACT

A communications infrastructure, such as a public land mobile network (PLMN) complying with the GPRS standards, is described comprising at least a local support node for packet stream communication with a plurality of terminals and a gateway support node for packet stream communication with an external network, which may be an IP network such as the public internet. The local support node and the gateway support node are arranged for interconnection by a point to point tunnel, a GTP tunnel in the case of GPRS via for instance an IP network, for carrying packets between each terminal and addressed servers on the external network. A control element and one or more edge servers are associated with the local support node. The edge servers are each associated with respective addresses on the external network and the control element is interposed between the local support node and the gateway support node. The control element is arranged in operation to extract from the tunnel packets destined for a predeterminable set of external network addresses and redirect the extracted packets to corresponding ones of the edge servers. Finally, the control element is arranged route packets received from the edge servers to a corresponding terminal via the local support node.

24 Claims, 4 Drawing Sheets

U.S. PATENT DOCUMENTS

| | | | |
|---|---|---|---|
| 7,620,389 B2 * | 11/2009 | Kallio et al. | 455/414.1 |
| 7,672,327 B2 * | 3/2010 | Kall et al. | 370/432 |
| 7,702,311 B2 * | 4/2010 | Mizell et al. | 455/406 |
| 2002/0131395 A1 * | 9/2002 | Wang | 370/349 |
| 2005/0165665 A1 * | 7/2005 | Koskinen et al. | 705/34 |
| 2006/0092901 A1 * | 5/2006 | Parantainen | 370/342 |

OTHER PUBLICATIONS

Roy et al., "A System Architecture for Managing Mobile Streaming media Services," Multimedia Signal Processing, 2002 IEEE Workshop, May 19, 2003, pp. 408-413.

Wee et al., "Research and Design of a Mobile Streaming Media Content Delivery Network," Proceedings 2003 International Conference on Multimedia and Expo, vol. 1, 2003, pp. 1-5.

* cited by examiner

COMMUNICATIONS INFRASTRUCTURE FOR CONTENT DELIVERY USING EDGE SERVERS

BACKGROUND OF THE INVENTION

The invention relates to the delivery of digital content in data networks, especially in mobile data networks.

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users. Mobile data networks, such as GPRS networks, are therefore becoming more widely implemented.

One issue with such networks is that they often employ a relatively small number of centralised gateway elements for access to other networks, such as the public internet. The role of such gateways is typically to act as a router serving all the IP addresses of the mobile stations, but this node may also include firewall, packet filtering, mobility management and charging functions that can usefully be centralised.

For instance, GPRS networks employ an element known as a Gateway GPRS Support Node (GGSN) through which all IP traffic to and from an external IP network, such as the public internet, must normally pass. The GGSNs generally connect to the public internet via a set of servers that protect the operator network, participate in the internet routing or start secure channels towards enterprise networks, for instance.

In parallel with such developments, content delivery systems are being built that deliver over fixed IP infrastructures rich media content, such as video, audio, documents, games or the like, to end users using wide area data networks, such as the public internet or corporate networks and content delivery protocols such as http, RTSP, SIP, or RTP, for instance. In order to make more efficient use of network bandwidth and to increase the quality of service, such content delivery systems are often arranged to distribute the content using servers that can serve user requests for content delivery as locally as possible. These servers are generally content delivery servers that are usually distributed at the edge of an IP core network and are thus generally referred to as edge servers. A mechanism is then provided for directing or forwarding end user requests for particular content items to a selected edge server based on various criteria such as geographical location, server availability and load, content availability or the like. In such systems, the edge servers are typically interconnected together via an IP network for automatic management of the devices and their content.

SUMMARY OF THE INVENTION

The invention is directed to enabling the use of such edge servers within mobile data networks, such as GPRS networks, without impact, or at least with reduced impact, on the existing infrastructure.

In at least preferred embodiments of the invention, this is achieved by a communications infrastructure, such as a public land mobile network (PLMN) complying with the GPRS standards, comprising at least a local support node, an SGSN in the case of GPRS, for packet stream communication with a plurality of terminals and a gateway support node, a GGSN in the case of GPRS, for packet stream communication with an external network, which may be an IP network such as the public internet.

The local support node and the gateway support node are arranged for interconnection by a point to point tunnel, a GTP tunnel in the case of GPRS via for instance an IP network which may be private to the operator of the communications infrastructure, for carrying packets between each terminal and addressed servers on the external network.

A control element and one or more edge servers are associated with the local support node. The edge servers are each associated with respective addresses on the external network and the control element is interposed between the local support node and the gateway support node. The control element is arranged in operation to extract from the tunnel packets destined for a predeterminable set of external network addresses and redirect the extracted packets to corresponding ones of the edge servers. The set of external network addresses can be predeterminable by being stored in a statically or dynamically configurable table, for instance. Finally, the control element is arranged route packets received from said edge servers to a corresponding terminal via the local support node.

This arrangement in effect positions the edge servers so that they are also at the edge of the communications infrastructure i.e. close to the local support node, while still enabling advantage to be taken of a centralised gateway support node for other functions, such as channel establishment, content presentation, mobility and authentication management, for instance.

In the embodiments primarily envisaged, the terminals would be mobile terminals and the infrastructure would comprise a plurality of local support nodes each serving a corresponding locality. A handover mechanism would be provided such that each terminal may only be located in one of said localities at any one time. However, application of similar techniques in comparable architectures for fixed terminals would not necessarily be excluded.

In these embodiments, each control element is preferably arranged to intercept communications between the local support node with which it is associated and the gateway support node to detect registration of a terminal within the locality of the local support node and to communicate corresponding routing control data to other such control elements within the infrastructure, and/or to the edge servers, so that packet streams transmitted by the edge servers may be directed to the terminal via the control element and the local support node with which the control element is associated.

In particularly preferred arrangements, one or more of the edge servers may be associated uniquely with a single local support node and at least one of the edge servers and the local support node may be co-located in a single premises.

The invention has been developed for an implementation in which the PLMN complies with the GPRS standards, the local support node being a standard SGSN and the gateway support node a standard GGSN, although it will be understood that application of the invention to similar or comparable infrastructures, whether standard or proprietary, is not excluded.

Other aspects of the invention provide content delivery systems that employ the above described approach, subsystems for use in such communications infrastructures, methods of operating communications infrastructures, and related control elements and computer program products.

BRIEF DESCRIPTION OF THE DRAWINGS

An embodiment of the invention will now be described by way of example only, with reference to the following figures, wherein.

DETAILED DESCRIPTION OF THE PREFERRED EMBODIMENT OF THE INVENTION

Figure 1:
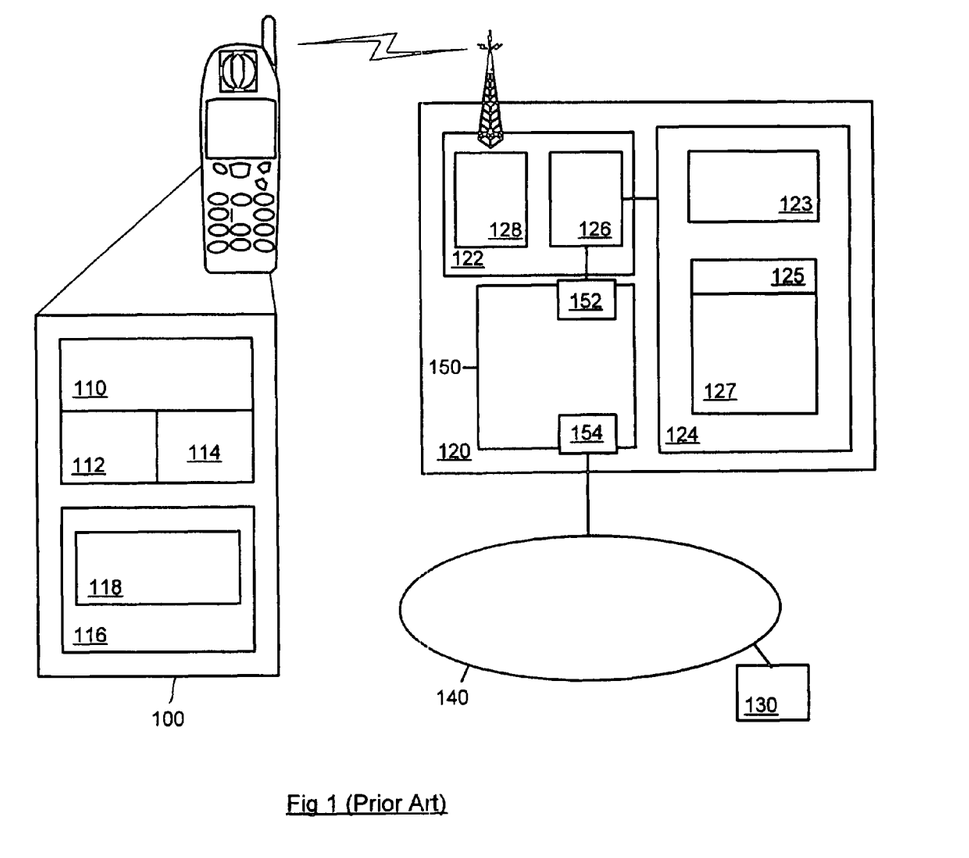
FIG. 1 is a schematic diagram showing a communication infrastructure in the prior art.

FIG. 1 shows in schematic form one type of known communication infrastructure for mobile users providing both telephony and data-bearer services. In this example, a mobile station 100, provided with a radio subsystem 110 and a phone subsystem 112, communicates with the fixed infrastructure of GSM PLMN (Public Land Mobile Network) 120 to provide voice telephony services. In addition, the mobile station 100 includes a data-handling subsystem 116 interworking, via data interface 114, with the radio subsystem 110 for the transmission and reception of data over a data-capable bearer service provided by the PLMN 120; the data-capable bearer service enables the mobile station 100 to communicate with a content delivery system 130 connected, for instance, to an external IP network 140 that may include the public Internet, a private intranet operated by the operator of the GPRS infrastructure and/or any other corporate intranet. The data handling subsystem 116 supports an operating environment 118 in which applications run, the operating environment including an appropriate communications stack.

More particularly, the fixed infrastructure 120 of the GSM PLMN comprises one or more Base Station Subsystems (BSS) 122 and a Network and Switching Subsystem NSS 124. Each BSS 122 comprises a Base Station Controller (BSC) 126 controlling multiple Base Transceiver Stations (BTS) 128 each associated with a respective "cell" of the radio network. When active, the radio subsystem 110 of the mobile station 100 communicates via a radio link with the BTS 128 of the cell in which the mobile station is currently located. As regards the NSS 124, this comprises one or more Mobile Switching Centers (MSC) 127 together with other elements such as Visitor Location Registers 125 and Home Location Register 123.

When the mobile station 100 is used to make a normal telephone call, a traffic circuit for carrying digitised voice is set up through the relevant BSS 122 to the NSS 124 which is then responsible for routing the call to the target phone (whether in the same PLMN or in another network).

With respect to data transmission to/from the mobile station 100, a data-capable bearer service is provided in the form of GPRS (General Packet Radio Service) which enables IP (or X.25) packet data to be passed from the data handling system of the mobile station 100, via the data interface 114, radio subsystem 110 and relevant BSS 122, to a core GPRS network 150 of the PLMN 120 (and vice versa). The core GPRS network 150 includes a SGSN (Serving GPRS Support Node) 152 interfacing BSC 126 with the network 150, and a GGSN (Gateway GPRS Support Node) 154 interfacing the network 150 with external IP network 140. An SGSN such as SGSN 152 typically serves a number of cells, each cell being served by a single BTS 128. The relatively small set of cells served by a single SGSN 152 is referred to as a routing area. Full details of GPRS can be found in the ETSI (European Telecommunications Standards Institute) GSM 03.60 specification. Using GPRS, the mobile station 100 can exchange packet data via the BSS 122 and GPRS network 150 with entities connected to the external IP network 140.

The data connection between the PLMN 120 and the external network 140 may pass through a firewall, that may be separate from or integrated into GGSN 154, with proxy and/or gateway functionality.

In FIG. 1, a content delivery server 130 is shown connected to the network 140, this server being accessible to the OS/application 118 running in the mobile station 100 by use of the GPRS bearer service described above.

The mobile station 100 may take many different forms. For example, it could be two separate units such as a mobile phone (providing elements 112 and 110) and a mobile PC (data-handling system 116) coupled by an appropriate link (wireline, infrared or short range radio system such as Bluetooth). Alternatively, mobile entity 100 could be a single unit such as a mobile phone. Of course, if data transmission/reception only is required (and not voice), the phone functionality 112 can be omitted; an example of this is a Personal Digital Assistant with built-in GSM data-capable functionality whilst another example would be a digital camera forming the data-handling subsystem also with built-in GSM data-capable functionality enabling the upload of digital images or a video stream from the camera to a storage server, for instance.

Whilst the above description has been given with reference to a PLMN based on GSM technology, it will be appreciated that other cellular radio technologies exist, such as UMTS access networks, that provide the same type of functionality as described for the GSM PLMN 120.

SGSN 152 includes software and related hardware that is configured to support the delivery of data packets to mobile station 100 within its routing area. SGSN 152 is also configured to perform packet routing and transfer, mobility management (attach/detach and location management), and logical link management, and the like. In addition, SGSN 152 is configured to authenticate mobile station 100 to GPRS network 150, by determining, for instance, the validity of a subscriber, whether mobile station 100 is associated with a selected service provider, and whether mobile station 100 may appropriately conduct communications over GPRS network 150. SGSN 152 may also employ HLR 123 to perform authentication actions, as well as other gating actions.

SGSN 152 communicates with GGSN by means of the GPRS Tunnelling Protocol (GTP) which enables IP tunnels between GPRS support nodes, ie GGSNs and SGSNs. GTP employs a tunnelling mechanism to carry IP packets, where a tunnel is a two-way, point-to-point path that carries encapsulated information between GSNs from a point of encapsulation to another point for decapsulation. GTP also employs out-of-band signaling packets, referred to as GTP-C messages, so that signaling paths are logically distinct from data paths. The GTP-C messages are used to perform path management, tunnel management, location management, service management, and mobility management functions.

One feature of GPRS is that IP is used as the network layer protocol for the core GPRS network 150 to connect eg SGSN 152 and GGSN 154. core GPRS network 150 is typically a private network owned or controlled by the operator of the mobile network, but the data could also pass over the public internet.

Mobile stations 100 are treated as stand-alone Internet hosts uniquely identified by an IP address. The IP addresses may be allocated in a number of ways. In simple implementations, each mobile station 100 may have a fixed IP address stored in the HLR 123, or a pool of IP addresses is maintained by an address allocation server (not shown) within network 150 or connected to the external network 140, for example a Dynamic Host Configuration Protocol (DHCP) or RADIUS server. Whenever a mobile station 100 is connected to a network, a signalling process is performed between the mobile station 100 and the address allocation server to assign an available IP address to the mobile station 100. In order to do so, mobile station 100 needs to send the address allocation server its unique ID. When the signalling process is de-activated, the IP address will be returned to the addressing pool and may be subsequently assigned to other terminals.

The logical connection in the GPRS network between mobile station 100 and the external IP network 140 is generally referred to as a packet data protocol (PDP) context.

In a PDP Context Activation Procedure, an MS 100 sends an Activate PDP Context Request message comprising PDP Type, PDP Address, and an APN (Access Point Name) parameter to an SGSN 152. The SGSN 152 validates the Activate PDP Context Request and uses the APM parameter to select a serving GGSN and resolve the IP address of the selected GGSN. If a GGSN 154 IP address can be resolved, the SGSN 152 sends a Create PDP Context Request message comprising PDP Type, PDP Address, and the APN to the affected GGSN 154. GGSN 154 may also use the APN to find an external network. The GGSN 154 creates a new entry in its PDP context table. The new entry allows the GGSN 154 to route IP packets between the SGSN 152 and the external PDP network and to start charging. GGSN 154 returns a Create PDP Context Response message to the SGSN 152. Normally, the GGSN allocates an IP address for the MS 100 and returns it to the MS 100 in the PDP context Response message.

The SGSN 152 returns an Activate PDP Context Accept message to the MS 100. After this, SGSN 152 is able to route IP packets between the GGSN and the MS. MS 100 maps outgoing IP packets to the proper PDP context, and GGSN 152 maps incoming packets to the proper PDP context.

A handover process is defined whereby a MS 100 sends a Routing Area update request to the serving SGSN whenever it changes cell. If the MS 100 has moved to a cell that is administered by a different SGSN than the cell from which the MS 100 has moved, then the SGSN serving the new cell requests the PDP context from the GGSN (identified using the APN parameter supplied by the MS).

It will be appreciated that the above is a simplified description of the context activation and handover processes and that other parameters would typically be exchanged and validated between MS 100, SGSN 152 and GGSN 154 to allow quality of service and billing information to be established, for instance.

Thus, in conventional operation, content server 130 is identified by a domain name and an IP address. The applications running within operating environment 118 of MS 100 are able to receive content from or deliver content to content server 130 using any suitable upper layer open or proprietary protocol, such as HTTP or RTSP (Real Time Streaming Protocol) for instance.

The above description of a GPRS communication infrastructure was presented for the purposes of understanding the present invention and will be well understood by those skilled in the art.

Figure 2:
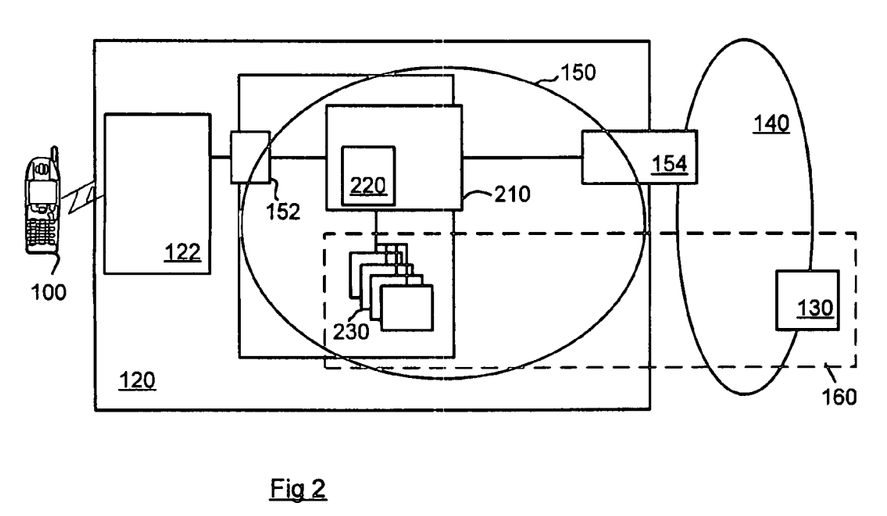
FIG. 2 is a schematic diagram showing a communication infrastructure in an embodiment of the invention.

Referring now to FIG. 2, a GPRS communication infrastructure will now be described in which one or more local surrogate origin edge servers 230 can be used to deliver content to mobile station 100 via a component 210 that will be referred to herein as a GPRS Control Point (GCP).

It is envisaged that most applications of the techniques to be described below would involve predominantly downstream traffic from server 130 to MS 100 for, for instance, delivery of an audio or video content stream, although applications that involve a predominantly upstream content flow, such as the uploading to storage or broadcasting of photos from a digital camera, a video stream from a video camera or an audio recording, are of course also possible.

GCP 210 is connected between SGSN 152 and the GGSN 154 and acts as an intermediate GSN node that terminates GTP tunnels from the SGSN 152 and opens corresponding new GTP tunnels with GGSN 154. The main function of the GCP 210 is to act as an intermediate GSN element between the SGSN 152 and the GGSN 154. Its role is to extract IP traffic from the GTP tunnels before it reaches the GGSN 154 and forward it directly to edge servers 230. Otherwise, GCP 210 appears to be a GGSN to SGSN 152 and appears to be an SGSN to GGSN 154. By terminating and re-opening the GTP tunnels, GCP 210 can extract, analyse and redirect the IP traffic within the tunnel. GCP 20 serves to analyzing the GTP and GTP-C requests from SGSN 152 and GGSN 154 and can decode, generate, and transmit GTP-C protocol request replies. The GCP device intercepts GTP-C tunnel establishment requests/replies to open the tunnel and keep a context.

In preferred embodiments at least, GCP 210 is co-located with the SGSN 152. The GPC receives from SGSN 152 a GTP-C Create PDP context request. GCP 210 creates a GTP interconnect context where it stores the APN, the PDIP address (if present), the Tunnel Endpoint ID (TEID) and the MSISDN. Then, it sends the GTP-C request to GGSN 154. GGSN 154 replies with a create PDP context response with PDIP address and TEID which are used to find the previous GTP interconnect context and store additional information. The response is then sent to SGSN 152.

GCP 210 can then receive IP packets from SGSN 152 and GGSN 154 and detects which packets need to be intercepted and re-routed towards the edge servers. For any packet received from one of edge servers 230, the IP address of the MS 100 stored in the PDP interconnect context is then used to select the right GTP channel (identified by the TEID) towards SGSN 152.

In operation, GCP 210 acts for most IP addresses in external network 140 simply as a pass through device that receives and forwards the IP packets to GGSN 154 for onward transmission and receives packets from GGSN 154 for transmission to the corresponding MS 100 via the appropriate SGSN 152.

However, GCP 210 is provided with a set of IP addresses 220, stored in a table or any other suitable way, that correspond to the edge servers 230. This set of IP addresses can be statically configured or can be received from the content delivery system—illustrated in FIG. 2 as 160—when edge servers 230 are deployed. GCP 210 scans IP traffic passing through the GTP tunnels to identify traffic that is destined for these addresses. This traffic is diverted directly to the corresponding edge server 230 using a local IP link. Similarly IP traffic received from the edge servers 230 that is destined for a MS 100 is directed to the GTP tunnel between GCP 210 and SGSN 152 that corresponds to the PDP context for that MS 100.

Thus, for any content request (RTSP, WAP or web request, for instance) that is addressed to a specific hostname that corresponds to an IP address in the set 220, the GCP redirects the request via an IP leg to the corresponding edge server 230. The request is thus extracted from the tunnel and is not forwarded to the GGSN 154. For inbound traffic, the GCP 210 is perceived as a router by the edge servers 230 and serves a range of IP addresses that have been allocated to the mobile stations 100 during PDP context establishment. GCP 210 is arranged to use conventional routing protocols to inform the edge servers that it is routing particular traffic for particular MSs 100 and then for particular IP addresses. These routing protocols are also running on the edge servers 230 to update their routing tables for the IP addresses allocated to the MSs 100. Routing updates are also sent by GCP 210 when a GTP tunnel is closed and IP addresses are no longer associated with MSs 100.

The edge servers 230 may be arranged in any suitable way as part of a conventional content delivery system—illustrated in FIG. 2 as 160. Such systems would generally include a mechanism that enables distribution of the content to the edge servers 230 and a mechanism for dynamically generating link to the edge servers according to the user's location, for instance, by including the link within a web page returned to the user by a web server, or through a dynamic DNS mechanism. The most appropriate content server 230 may be inferred from the originating IP address allocated to MS 100 or any other information available from the PLMN 120. Similarly, the set of IP addresses 220 corresponding to the edge servers 230 may be statically configured or be dynamically maintained in any suitable way.

The edge servers 230 can be co-located in the same operator premises with the GCP 210 and/or SGSN 152 or can serve multiple GCPs through IP network 150. A content server 130 may remain available behind the GGSN 154 for use as a back-up upon failure of a server 230, for instance.

Figure 3A:
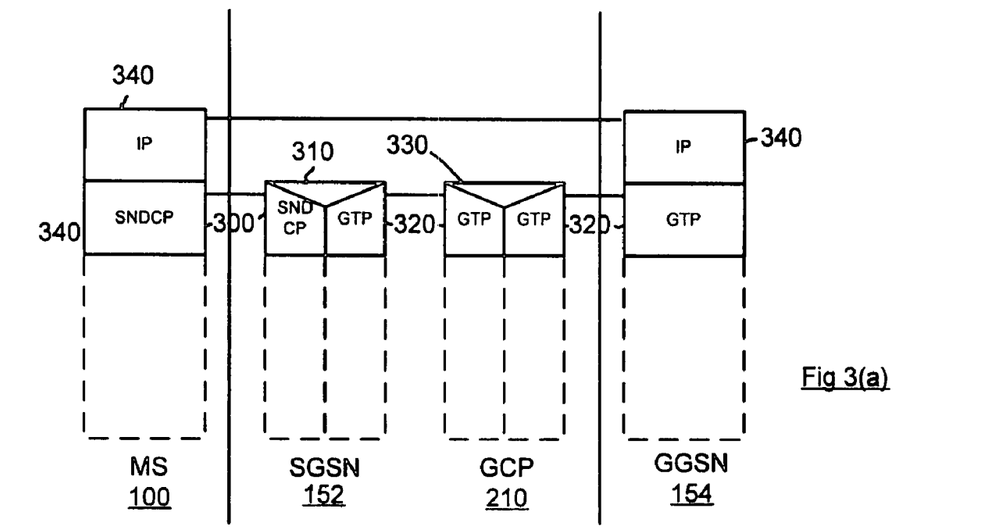
FIG. 3 illustrates the protocols employed in various components of the communication infrastructure of FIG. 2.
Figure 3B:
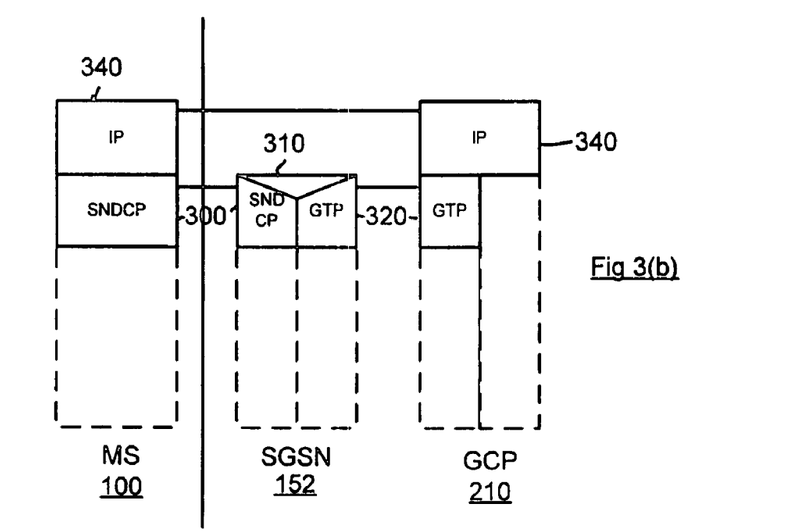

The relevant set of protocols implemented within the various components in an implementation within a GSM network is illustrated in FIG. 3. FIG. 3 (*a*) illustrates the protocols employed when GCP 210 is operating is pass through mode to pass traffic on to GGSN 154. As illustrated in FIG. 3(*a*), a protocol referred to as the Subnetwork-Dependant Convergence Protocol (SNDCP) carries IP network traffic transparently between MS 100 and SGSN 152 (the lower level interaction with BSS 122 is not shown in FIG. 3). SGSN 300 terminates the SNDCP layer and comprises an interworking layer that interfaces with a GTP layer 320. GCP 210 includes GTP layers 320 and an interworking layer that serves to analyse the packets. For packets not destined for or received from edge servers 230 a further GTP layer 320 is available to direct packets to GGSN 154. GGSN is shown as comprising a GTP layer 320 and an IP layer 330. FIG. 3(*b*) illustrates the protocols employed by GCP 210 for communication with edge servers 230.

It will be understood that interconnecting edge server 230 inside the GPRS network 150 requires end user mobility and handover to be managed if content delivery is not to be interrupted when the user moves from one routing area to another. For any move inside a routing area, the mobility is transparent to the edge servers 230 and the GCP 210. For any move to a another routing area a SGSN handover is required and the GCP 210 preferably implements specific capabilities to be described below, although it may be appreciated that a number of different arrangements are possible.

Figure 4:
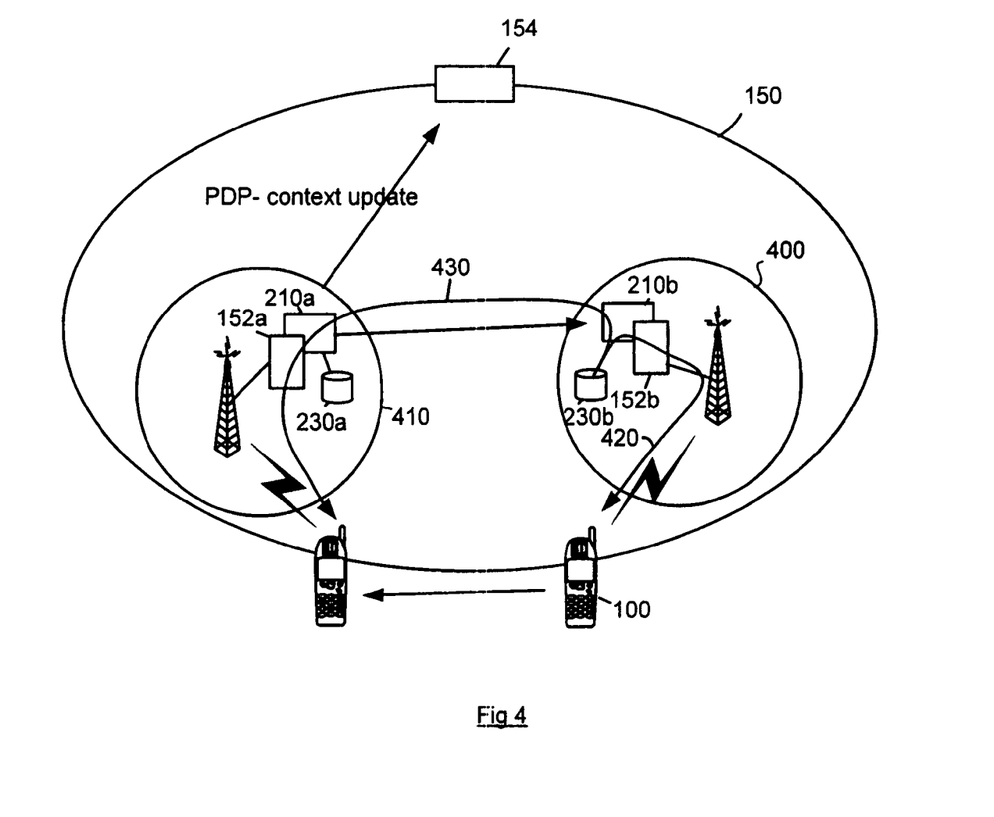
FIG. 4 illustrates a handover procedure in the communication infrastructure of FIG. 2.

In one embodiment, the need for a handover is detected by intercepting the GTP-C PDP context update requests that are issued to GGSN 154 by the SGSN serving the cell into which the mobile station 100 has moved as part of the conventional handover process. This is illustrated in FIG. 4, which shows a mobile station 100 moving from a first cell 400 to a second cell 410 during a streaming operation from a content server 230*b* illustrated by arrow 420. The GCP 210*a* associated with the SGSN 152*a* of cell 410, intercepts the PDP-context update request and acts to create a new PDP interconnect context (as it has received a create PDP context), forward the context update request to the GGSN and informs the GCP 210*b* and/or the edge server 230*b* of the move. This can be achieved by any suitably defined standard routing protocol that enables the information to be multicast or broadcast over network 150 that any flow for a particular MS IP address has to go through a routing change to GCP 210*b*. This message may be acted upon by edge server 230*b* that will redirect the traffic to the GCP 210*b*, as shown by arrow 430. As previously said, the edge server needs to be part of the routing cloud by implementing a routing protocol to dynamically update its routing table.

It will be understood that the conventional handover process of GPRS provides for the MS 100 to retain its allocated IP address. Of course, as soon as the stream in progress is completed and a new content request is made by the mobile station 100 once it is within the new cell, it is possible the new edge server 230*a* that corresponds to SGSN 152*a* will be identified by the content delivery system 160 to serve the new request.

Outgoing data streams from MS 100 are is sent to the current server 230*b* as long as MS 100 uses the IP address of the current server 230*b*.

It will be appreciated that commercialised forms of the present embodiment would in practice take the form of a set of computer programs adapted to run on general or special purpose computing platforms within general or special purpose operating environments such as are provided by the Microsoft Windows, Linux or HP-UX operating systems and their related programming libraries and tools. These programs may be marketed in the form of suitably coded computer program products including program code elements that implement the functionality described. It will be appreciated though that the techniques described may equally be implemented as special purpose hardware or any combination of software, hardware and/or firmware.

The above discussion is meant to be illustrative of the principles and various embodiments of the present invention. Numerous variations and modifications in each of the illustrated examples will become apparent to those skilled in the art once the above disclosure is fully appreciated. It is intended that the following claims be interpreted to embrace all such variations and modifications.

The invention claimed is:

1. A communications infrastructure comprising at least
   a local support node for packet stream communication with
      a plurality of terminals and
   a gateway support node for packet stream communication
      with an external network,
   the local support node and the gateway support node being
      arranged for interconnection by a point-to-point tunnel
      over a core network for carrying packets between each
      terminal and addressed servers on the external network,
      wherein a control element and one or more edge servers
      are associated with the local support node, the edge
      servers being each associated with respective addresses
      on the external network and the control element being interposed in the core network between the local support node and the gateway support node and arranged in operation to
(i) extract from the tunnel and redirect packets destined for a predeterminable set of external network addresses to corresponding ones of the edge servers and
(ii) to route packets received from said edge servers to a corresponding terminal via the local support node associated with the support element.

2. A communications infrastructure as claimed in claim 1 wherein the terminals are mobile terminals, the infrastructure comprising a plurality of local support nodes each serving a corresponding locality and a handover mechanism such that each terminal may only be located in one of said localities at any one time.

3. A communications infrastructure as claimed in claim 2 wherein each control element is arranged to intercept communications between the local support node with which it is associated and the gateway support node to detect registration of a terminal within the locality of the local support node and to communicate corresponding routing control data to other such control elements within the infrastructure and/or to the edge servers so that packet streams transmitted by the edge servers may be directed to the terminal via the control element and local support node with which the control element is associated.

4. A communications infrastructure as claimed in claim 1 wherein one of more of the edge servers are associated uniquely with a single local support node.

5. A communications infrastructure as claimed in claim 1 wherein at least one of the edge servers and the local support node are co-located in a single premises.

6. A communications infrastructure as claimed in claim 1 wherein the local support node and the gateway support node are interconnected by an IP network.

7. A communications infrastructure as claimed in claim 6 wherein the IP network is private to the operator of the communications infrastructure.

8. A communications infrastructure as claimed in claim 1 wherein the tunnels are GTP tunnels, and the control element terminates the GTP tunnels from the local support node and opens corresponding new GTP tunnels with the gateway support node.

9. A communications infrastructure as claimed in claim 1 wherein the control element and edge servers are associated with a first locality and the control element is configured to transfer an ongoing data stream originating at one of the edge servers to a different control element associated with a second locality based on one of the terminals moving from the first locality to the second locality while the data stream is being transferred to the terminal.

10. A communications infrastructure as claimed in claim 1 wherein the external network is an IP network and the external network addresses are IP addresses.

11. A communications infrastructure as claimed in claim 1 wherein the control element is configured to appear to the local support node to be the gateway support node and to appear to the gateway support node to be the local support node.

12. A communications infrastructure as claimed in claim 1 in the form of a public land mobile network.

13. A communications infrastructure as claimed in claim 12 complying with the GPRS standards, the local support node being a standard SGSN and the gateway support node a standard GGSN.

14. A content delivery system comprising at least one edge server that forms part of a communications infrastructure as claimed in claim 1.

15. A content delivery system as claimed in claim 14 wherein the at least one edge server is collocated with a local support node of the communications infrastructure in a single premises.

16. A routing area subsystem for a communications infrastructure, the subsystem comprising a local support node for packet stream communication with a plurality of terminals, the local support node being arranged for interconnection over a core network with a gateway support node by a point to point tunnel for packet stream communication with an external network, the point to point tunnel carrying packets between each terminal and addressed servers on the external network, the subsystem comprising a control element and one or more edge servers associated with the local support node, the edge servers being each associated with respective addresses on the external network and the control element being interposed between the local support node and the gateway support node and arranged to extract from the tunnel and redirect packets destined for a predeterminable set of external network addresses to corresponding ones of the edge servers and to route packets received from said edge servers to a corresponding terminal via the local support node.

17. A routing area subsystem as claimed in claim 16 wherein the control element is arranged to intercept communications between the local support node and the gateway support node to detect registration of a terminal within the locality of the local support node and to communicate corresponding routing control data to other such control elements and/or edge servers within the communications infrastructure so that packets transmitted by the edge servers may be directed to the terminal via the local support node.

18. A method for operating a communications infrastructure comprising at least a local support node for packet stream communication with a plurality of terminals and a gateway support node for packet stream communication with an external network, the local support node and the gateway support node being arranged for interconnection over a core network by a point to point tunnel for carrying packets between each terminal and addressed servers on the external network, the method comprising:
providing one or more edge servers associated with the local support node, the edge servers being each associated with respective addresses on the external network;
extracting packets destined for a predeterminable set of external network addresses from the tunnel and redirecting said extracted packets to corresponding ones of the edge servers; and to routing packets received from said edge servers to a corresponding terminal via the local support node.

19. A method as claimed in claim 18 comprising intercepting communications between the local support node and the gateway support node to detect registration of a terminal within the locality of the local support node and communicating corresponding routing control data within the infrastructure so that packets transmitted by the edge servers may be directed to the terminal via the local support node.

20. A communications infrastructure comprising at least a local element for packet stream communication with a plurality of terminals and a gateway element for packet stream communication with an external network, the local element and the gateway element being arranged for interconnection by a point-to-point tunnel over a core network for carrying packets between each terminal and addressed servers on the external network, wherein a control element and one or more edge servers are associated with the local element, the edge servers being each associated with respective addresses on the external network and the control element being interposed in the core network between the local element and the gateway element and arranged in operation to (i) extract from the tunnel and redirect packets destined for a predeterminable set of external network addresses to corresponding ones of the edge servers and (ii) to route packets received from said edge servers to a corresponding terminal via the local element associated with the support element.

21. A control element for use in a communications infrastructure comprising at least a local support node for packet stream communication with a plurality of terminals and a gateway support node for packet stream communication with an external network, the local support node and the gateway support node being arranged for interconnection by a point-to-point tunnel over a core network for carrying packets between each terminal and addressed servers on the external network, wherein one or more edge servers are associated with the local support node, the edge servers being each associated with respective addresses on the external network, the control element being arranged in operation to (i) extract from the tunnel and redirect packets destined for a predeterminable set of external network addresses to corresponding ones of the edge servers and (ii) to route packets received from said edge servers to a corresponding terminal via the local support node associated with the support element; and wherein the control element is configured to appear to the local support node to be the gateway support node and to appear to the gateway support node to be the local support node.

22. A control element as claimed in claim 21 arranged to intercept communications between a local support node with which it is associated and the gateway support node to detect registration of a terminal within the locality of the local support node and to communicate corresponding routing control data to other such control elements within the infrastructure and/or to the edge servers so that packet streams transmitted by the edge servers may be directed to the terminal via the control element and local support node with which the control element is associated.

23. A non-transitory computer program product for use in a communications infrastructure comprising at least a local support node for packet stream communication with a plurality of terminals and a gateway support node for packet stream communication with an external network, the local support node and the gateway support node being arranged for interconnection by a point-to-point tunnel over a core network for carrying packets between each terminal and addressed servers on the external network, wherein one or more edge servers are associated with the local support node, the edge servers being each associated with respective addresses on the external network, the computer program product coded with program code elements that when executed provide a control node for (i) extracting from the tunnel and redirecting packets destined for a predeterminable set of external network addresses to corresponding ones of the edge servers and (ii) routing packets received from said edge servers to a corresponding terminal via the local support node associated with the support element;
wherein the program code elements cause the control node to emulate the gateway support node with regard to the local support node and to emulate the local support node with regard to the gateway support node.

24. A non-transitory computer program product as claimed in claim 23 coded with program code elements for intercepting communications between a local support node with which it is associated and the gateway support node to detect registration of a terminal within the locality of the local support node and program code elements for communicating corresponding routing control data to other such control elements within the infrastructure and/or to the edge servers so that packet streams transmitted by the edge servers may be directed to the terminal via the control element and local support node with which the control element is associated.

* * * * *